(12) United States Patent
Adams

(10) Patent No.: X8802
(45) Date of Patent: May 2, 1835

(54) COMBS, TEETH, CUTTING OF

(76) Inventor: Lemuel Adams

United States Patent Patent No.: X8802

Samuel Adams Reading Conn
Letters Patent

The schedule referred to in these Letters Patent and making part of the same
containing a description in the words of the said Samuel Adams himself,
of his improvement in the art of Cutting Comb teeth To all to whom these presents shall come –
Be it known that I Samuel Adams of Redding in the County of Fairfield and
State of Connecticut have invented a new and useful improvement in the art
of Cutting Comb teeth which substitutes power for manual labour and that the
following is a full and exact description thereof. It consists of a shaft or axle of
suitable length with bearings for it to revolve upon also a pulley to revolve upon
the axle the nave of which through which the axle passes is of sufficient length
on one side to admit of catches which are made straight upon one side and
slanting upon the other until the space between them comes to a point at the
bottom. The other end of said nave is of sufficient length to admit of a groove or
channel to be formed around it for a lever to rest in and not interfere with the
surface of the pully or the belt which runs upon the said pully. There is also a
collar equal in diameter to the nave of the pully the said collar has catches upon it
to fit those up the above described nave this collar is made fast upon the aforemen-
-tioned axle with keys; there is also a shoulder around the axle a short distance
from that part of the nave in which the channel is formed. There is likewise a
lever one end of which is made to fit the channel in the nave of the pully: this
lever is fastened by a pin through it one third of its length distant from the end
which is fitted to the channel. The other end is united by a joint to a rod which
extends in the same direction with the axle and the other end of the rod is also
united by a joint to a square of which one end is longer than the other, the rod
is attached to the shortest end of the square the said square is placed upright
directly under a bench that the cutting machine stands upon and is made
fast to the bench at its angle corner by a hinge another rod is also attached by
a joint to the longest end of the square which rod extends upwards by the opposite side of the bench and over it is placed a hand piece one end of which op-
perates as a lever upon the last mentioned rod and the other end is fastened to the
bench by a hinge under the hand piece between the hinge and the said rod
is a strong wire spring directly over the hand piece is a thumb piece placed
upright the bottom end projecting backwards sufficiently for the hand piece to
rest under it. the said thumb piece is fastened by a pin through the center a
spring is also placed behind the thumb piece below the pin The usefulness of
the above described inventiom may be appretiated by understanding that the usual
method of cutting comb teeth is by manual labour whilst by applying this
invention to a crank comb cutting machine the work is performed by power
The application may be made by uniting the foregoing described axle with
the axle of the cutting machine by a coupler Whilst the above mentioned
hand piece rests under the thumb piece the catches upon the nave of the
pully and those upon the collar are disunited and the pully revolves upon the
axles between the shoulders and the collar. but by a slight pressure upon the thumb
piece the hand piece is forced upward by the spring which is under it which mo-
tion unites the catches upon the revolving pully with those upon the collar and
the work is carried with the pully likewise by a slight pressure upon the hand
piece it is forced under the thumb piece which again disunites the catch
-es and the work instantly ceases but the pully continues to revolve Witnesses
Gersham Hill
Elem Hill Samuel Adams Enrd.
M.G.C.